another outdoor unit (2A, 2B). In cooling operation, the respective oil equalization mechanisms (9A, 9B) control respective gas bypass passages (95, 96) and respective oil equalizing bypass pipes (93, 94) to open and close them so that lubricating oil flows alternately between the outdoor units (2A, 2B), thereby equalizing lubricating oil. In heating operation, the respective oil equalization mechanisms (9A, 9B) control the respective oil equalizing bypass pipes (93, 94) to open and close them so that lubricating oil flows alternately between the outdoor units (2A, 2B) and hold the downstream sides of the oil equalization mechanisms (9A, 9B) in low pressure condition, thereby equalizing lubricating oil.

United States Patent
Sada

Patent Number: 5,673,570
Date of Patent: Oct. 7, 1997

[54] OIL EQUALIZING OPERATION CONTROL DEVICE FOR AIR CONDITIONER

[75] Inventor: Shinri Sada, Osaka, Japan

[73] Assignee: Daikin Industries, Ltd., Osaka, Japan

[21] Appl. No.: 596,369

[22] PCT Filed: Jun. 21, 1995

[86] PCT No.: PCT/JP95/01230
§ 371 Date: Feb. 22, 1996
§ 102(e) Date: Feb. 22, 1996

[87] PCT Pub. No.: WO96/00872
PCT Pub. Date: Jan. 11, 1996

[30] Foreign Application Priority Data

Jun. 29, 1994 [JP] Japan ................. 6-147849
Jun. 29, 1994 [JP] Japan ................. 6-147855

[51] Int. Cl.$^6$ ................. F25B 1/00
[52] U.S. Cl. ................. 62/468; 62/193
[58] Field of Search ................. 62/468, 469, 470, 62/192, 193, 510, 175

[56] References Cited

U.S. PATENT DOCUMENTS

| | | | |
|---|---|---|---|
| 3,201,949 | 8/1965 | Kocher | 62/192 |
| 4,557,115 | 12/1985 | Nakamura | 62/193 X |
| 5,094,598 | 3/1992 | Amata et al. | 62/468 X |
| 5,279,131 | 1/1994 | Urushihata et al. | 62/468 X |

FOREIGN PATENT DOCUMENTS

| | | |
|---|---|---|
| 3186156 | 8/1991 | Japan. |
| 4324069 | 11/1992 | Japan. |
| 5296583 | 11/1993 | Japan. |
| 6094313 | 4/1994 | Japan. |

*Primary Examiner*—Harry B. Tanner
*Attorney, Agent, or Firm*—Sixbey Friedman Leedom & Ferguson; Gerald J. Ferguson, Jr.; Thomas W. Cole

[57] ABSTRACT

Two outdoor units (2A, 2B) are connected in parallel to a main liquid line (7L) and a main gas line (7G). Three indoor units (3A, 3B, 3C) are connected in parallel to the main liquid line (7L) and the main gas line (7G). The outdoor units (2A, 2B) are each provided with an oil equalization mechanism (9A, 9B) for conducting a surplus out of lubricating oil stored in an oil reserving part (91) provided on the discharge side of a compressor (21) to the suction side of a compressor (21) of another outdoor unit (2A, 2B). In cooling operation, the respective oil equalization mechanisms (9A, 9B) control respective gas bypass passages (95, 96) and respective oil equalizing bypass pipes (93, 94) to open and close them so that lubricating oil flows alternately between the outdoor units (2A, 2B), thereby equalizing lubricating oil. In heating operation, the respective oil equalization mechanisms (9A, 9B) control the respective oil equalizing bypass pipes (93, 94) to open and close them so that lubricating oil flows alternately between the outdoor units (2A, 2B) and hold the downstream sides of the oil equalization mechanisms (9A, 9B) in low pressure condition, thereby equalizing lubricating oil.

9 Claims, 8 Drawing Sheets

OIL EQUALIZING OPERATION CONTROL DEVICE FOR AIR CONDITIONER

TECHNICAL FIELD

This invention relates to an oil equalizing operation control device for an air conditioner having a plurality of thermal source units.

BACKGROUND ART

There has been a conventional air conditioner in which a compressor, a four-way selector valve, an outdoor heat exchanger, a motor-operated expansion valve and an indoor heat exchanger are connected in order as disclosed in the Japanese Patent Application Laid-Open Gazette No. 3-186156. In cooling operation, by the switching of the four-way selector valve, refrigerant discharged from the compressor is condensed by the outdoor heat exchanger, is expanded by the motor-operated expansion valve and is then evaporated by the indoor heat exchanger. In heating operation, by the switching of the fourway selector valve, refrigerant discharged from the compressor is condensed by the indoor heat exchanger, is expanded by the motor-operated expansion valve and is then evaporated by the outdoor heat exchanger.

Problem to be solved

Since the above-mentioned air conditioner has a single outdoor unit, no regard is needed for oil equalizing operation if only oil backing operation is performed.

Accompanying with the recent increased capacity of an air conditioner, there has been developed an air conditioner in which a plurality of outdoor units are provided. In this case, lubricating oil is discharged from each of the compressors of the outdoor units. However, since lubricating oil is not necessarily returned to each of the compressors of the outdoor units by the same amount as discharged therefrom, oil collecting phenomena that lubricating oil is collected to the compressor of one of the outdoor units may occur.

When the above oil collecting phenomena occur, one of the compressors may cause lack in lubricating oil. This presents a problem that air conditioning cannot be continued.

This invention has been made in view of the above problem and has its object of eliminating oil collecting phenomena to prevent lack in lubricating oil when an air conditioner is provided with a plurality of thermal source units.

DISCLOSURE OF INVENTION

In order to attain the above object, this invention takes measures of conducting lubricating oil from an oil reserving part on the high-pressure side of a compressor of one thermal source unit to the low-pressure side of another thermal source unit.

Constitution

In detail, as shown in FIG. 1, the invention is an air conditioner comprising: a plurality of thermal source units (2A, 2B, ... ) each having at least a compressor (21) and a thermal-source-side heat exchanger (24); a main liquid line (7L) to which the plural thermal source units (2A, 2B, ... ) are connected in parallel with one another; a main gas line (7G) to which the plural thermal source units (2A, 2B, ... ) are connected in parallel with one another; and a user unit (3A) which has at least a used-side heat exchanger (32) and is connected to the main liquid line (7L) and the main gas line (7G), in which refrigerant discharged from the compressor (21) is condensed by one of the heat exchangers (24, 32), is expanded by the expansion mechanism (25) and is then evaporated by the other heat exchanger (32, 24).

In addition, there are provided oil equalization mechanisms (9A, 9B, ... ) for conducting lubricating oil stored in an oil reserving part (91) provided on the discharge side of the compressor (21) of each of the thermal source units (2A, 2B, ... ) to the suction side of the compressor (21) of the other thermal source unit (2A, 2B, ... ).

The oil equalization mechanisms (9A, 9B, ... ) each conduct only surplus lubricating oil above a set amount of storage out of lubricating oil stored in the oil reserving part (91) to the suction side of the compressor (21) of the other thermal source unit (2A, 2B, ... ).

The compressor (21) has an oil discharge mechanism (40) for discharging, when lubricating oil stored in the compressor (21) exceeds a set amount, the excess of lubricating oil and the oil equalization mechanisms (9A, 9B) each conduct only surplus lubricating oil above a set amount of storage out of lubricating oil stored in the oil reserving part (91) to the suction side of the compressor (21) of the other thermal source unit (2A, 2B, ... ).

The oil reserving part (91) has an oil separating function of separating lubricating oil from discharged refrigerant.

The oil equalization mechanisms (9A, 9B, ... ) each have an oil equalizing bypass pipe (93, 94, ... ) for conducting lubricating oil from the oil reserving part (91, 91, ... ) to the suction side of the compressor (21) of the other thermal source unit (2A, 2B, ... ), an end of the oil equalizing bypass pipe (93, 94, ... ) is introduced into the oil reserving part (91) and the introduced end of the oil equalizing bypass pipe (93, 94, ... ) is located at the level higher by a set height than the bottom of the oil reserving part (91).

There is provided a pressure equalizing line (6E) which is connected at respective ends thereof to respective refrigerant piping sections (26) connected to the gas refrigerant sides of the thermal-source-side heat exchangers (24) of the respective thermal source units (2A, 2B, ... ) and allows interruptable communication of gas refrigerant in dual directions between the thermal source units (2A, 2B, ... ).

Further, the oil equalization mechanisms (9A, 9B, ... ) each have a gas bypass passage (95, 96, ... ) which is connected to the pressure equalizing line (6E) and a gas line (6A, 6B, ... ) of the corresponding thermal source unit (2A, 2B, ... ) and allows interruptable communication of lubricating oil, and an oil equalizing bypass pipe (93, 94, ... ) which is connected to the oil reserving part (91) and the pressure equalizing line (6E) and allows interruptable communication of lubricating oil. In addition, oil equalizing control means (81) is provided for controlling the respective gas bypass passages (95, 96, ... ) and the respective oil equalizing bypass pipes (93, 94, ... ) between their communication states and their interruption states so that lubricating oil flows alternately between the thermal source units (2A, 2B, ... ) in cooling cycle operation.

A first thermal source unit (2A) and a second thermal source unit (2B) are provided.

Further, the oil equalization mechanism (9A) of the first thermal source unit (2A) has a second gas bypass passage (96) connected to the pressure equalizing line (6E) and the gas line (6B) of the second thermal source unit (2B), and has a first oil equalizing bypass pipe (93) connected to the oil reserving part (91) of the first thermal source unit (2A) and the pressure equalizing line (6E).

Furthermore, the oil equalization mechanism (9B) of the second thermal source unit (2B) has a first gas bypass passage (95) connected to the pressure equalizing line (6E) and the gas line (6A) of the first thermal source unit (2A), and has a second oil equalizing bypass pipe (94) connected to the oil reserving part (91) of the second thermal source unit (2B) and the pressure equalizing line (6E).

In addition, the oil equalizing control means (81) is so composed as to perform a first oil equalizing operation for providing communication in the first oil equalizing bypass pipe (93) and the second gas bypass passage (96) and interrupting the second oil equalizing bypass pipe (94) and the first gas bypass passage (95) to conduct lubricating oil from the first thermal source unit (2A) to the second thermal source unit (2B) and to perform a second oil equalizing operation for providing communication in the second oil equalizing bypass pipe (94) and the first gas bypass passage (95) and interrupting the first oil equalizing bypass pipe (93) and the second gas bypass passage (96) to conduct lubricating oil from the second thermal source unit (2B) to the first thermal source unit (2A).

There is provided a pressure equalizing line (6E) which is connected at respective ends thereof to respective refrigerant piping sections (26) connected to the gas refrigerant sides of the thermal-source-side heat exchangers (24) of the respective thermal source units (2A, 2B, . . . ) and allows interruptable communication of gas refrigerant in dual directions between the thermal source units (2A, 2B, . . . ).

Further, the oil equalization mechanisms (9A, 9B, . . . ) each have a gas bypass passage (95, 96, . . . ) connected to the pressure equalizing line (6E) and a gas line (6A, 6B, . . . ) of the corresponding thermal source unit (2A, 2B, . . . ) and allows interruptable communication of lubricating oil, and an oil equalizing bypass pipe (93, 94, . . . ) connected to the oil reserving part (91) and the pressure equalizing line (6E) and allows interruptable communication of lubricating oil. In addition, oil equalizing control means (81) is provided for controlling the respective gas bypass passages (95, 96, . . . ) and the respective oil equalizing bypass pipes (93, 94, . . . ) between their communication states and their interruption states so that lubricating oil simultaneously flows in dual directions between the thermal source units (2A, 2B, . . . ) in cooling operation.

There is provided a pressure equalizing line (6E) which is connected at respective ends thereof to respective refrigerant piping sections (26) connected to the gas refrigerant sides of the thermal-source-side heat exchangers (24) of the respective thermal source units (2A, 2B, . . . ) and allows interruptable communication of gas refrigerant in dual directions between the thermal source units (2A, 2B, . . . ).

Further, the oil equalization mechanisms (9A, 9B, . . . ) each have an oil equalizing bypass pipe (93, 94, . . . ) connected to the pressure equalizing line (6E) and the oil reserving part (91). In addition, oil equalizing control means (81) is provided for controlling the respective oil equalizing bypass pipes (93, 94, . . . ) between their communication states and their interruption states so that lubricating oil flows alternately between the thermal source units (2A, 2B, . . . ) in heating cycle operation and for holding the downstream sides of the oil equalization mechanisms (9A, 9B, . . . ) in low pressure condition.

A first thermal source unit (2A) and a second thermal source unit (2B) are provided.

Further, the oil equalization mechanism (9A) of the first thermal source unit (2A) has a first oil equalizing bypass pipe (93) connected to the oil reserving part (91) of the first thermal source unit (2A) and the pressure equalizing line (6E).

Furthermore, the oil equalization mechanism (9B) of the second thermal source unit (2B) has a second oil equalizing bypass pipe (94) connected to the oil reserving part (91) of the second thermal source unit (2B) and the pressure equalizing line (6E).

In addition, the oil equalizing control means (81) is so composed as to perform a first oil equalizing operation for providing communication in the first oil equalizing bypass pipe (93) and the pressure equalizing line (6E), interrupting the second oil equalizing bypass passage (94) and adjusting the expansion mechanism (25) of the second thermal source unit (2B) into a small opening to conduct lubricating oil from the first thermal source unit (2A) to the second thermal source unit (2B) and to perform a second oil equalizing operation for providing communication in the second oil equalizing bypass pipe (94) and the pressure equalizing line (6E), interrupting the first oil equalizing bypass pipe (93) and adjusting the expansion mechanism (25) of the first thermal source unit (2A) into a small opening to conduct lubricating oil from the second thermal source unit (2B) to the first thermal source unit (2A).

Operations

In the invention having the above structure, in cooling operation or heating operation, each of the oil equalization mechanisms (9A, 9B, . . . ) conducts lubricating oil stored in the oil reserving part (91) provided on the discharge side of the thermal source unit (2A, 2B, . . . ) to the suction side of the compressor (21) of the other thermal source unit (2A, 2B, . . . ), thereby performing oil equalization between the thermal source units (2A, 2B, . . . ).

Particularly, only surplus lubricating oil is conducted to the suction side of the other thermal source unit (2A, 2B, . . . ). In the invention of claim 3, when lubricating oil stored in the compressor (21) exceeds a set amount, the excess of lubricating oil is discharged by the oil discharge mechanism (40) and is then stored in the oil reserving part (91).

The oil reserving part (91) stores lubricating oil separated from refrigerant. When an amount of storage of lubricating oil in the oil reserving part (91) exceeds the set level so that surplus lubricating oil stores in the oil reserving part (91), only the surplus lubricating oil above the set amount of storage flows out through the oil equalizing pipe (93, 94, . . . ).

In cooling cycle operation, lubricating oil stored in the oil reserving part (91) of the first thermal source unit (2A) passes from the first oil equalizing bypass pipe (93) to the pressure equalizing line (6E), flows into the gas line (6B) through the second gas bypass passage (96) and is then introduced into the compressor (21) of the second thermal source unit (2B).

Thereafter, on the contrary, lubricating oil stored in the oil reserving part (91) of the second thermal source unit (2B) passes from the second oil equalizing bypass pipe (94) to the pressure equalizing line (6E), flows into the gas line (6A) through the first gas bypass passage (95) and is then introduced into the compressor (21) of the first thermal source unit (2A). Oil equalization between the thermal source units (2A, 2B) is performed in such a manner as to repeat the above operation.

Lubricating oil stored in the oil reserving part (91) of each of the thermal source units (2A, 2B, . . . ) passes from the oil equalizing bypass passage (93, 94, . . . ) to the pressure equalizing line (6E), flows into the gas line (6A, 6B, . . . ) through the gas bypass passage (95, 96, . . . ) and is then introduced into the compressor (21) of the other thermal source unit (2A, 2B, . . . ). In this manner, oil equalization is performed between the thermal source units (2A, 2B, . . . ).

In heating cycle operation, the expansion mechanism (25) of the second thermal source unit (2B) is adjusted into a small opening so that the downstream side of the oil equalization mechanism (9A) is turned into a low pressure. Thus, lubricating oil stored in the oil reserving part (91) of the first thermal source unit (2A) passes from the first oil equalizing bypass pipe (93) to the pressure equalizing line (6E) and is then introduced into the compressor (21) of the second thermal source unit (2B).

Thereafter, on the contrary, the expansion mechanism (25) of the first thermal source unit (2A) is adjusted into a small opening and the downstream side of the oil equalization mechanism (9B) is turned into a low pressure. Thus, lubricating oil stored in the oil reserving part (91) of the second thermal source unit (2B) passes from the second oil equalizing bypass pipe (94) to the pressure equalizing line (6E) and is then introduced into the compressor (21) of the first thermal source unit (2A). Oil equalization between the thermal source units (2A, 2B) is performed in such a manner as to repeat the above operation.

Effects

Since lubricating oil is conducted from a high pressure side of each thermal source unit (2A, 2B, . . . ), which is the discharge side of the compressor (21), to a low pressure side of the other thermal source unit (2A, 2B, . . . ), there can be securely prevented oil collecting phenomena that lubricating oil collects to one of the thermal source units (2A, 2B, . . . ).

As a result, lack in lubricating oil can be securely prevented so that secure normal temperature control operation can be continued.

Since surplus lubricating oil which is stored in the oil reserving part (91) and exceeds a set amount of storage is discharged, the oil collecting phenomena can be securely eliminated so that normal temperature control operation can be securely continued.

In particular, oil collecting phenomena can be prevented while lack in lubricating oil can be prevented in the thermal source units (2A, 2B, . . .) from which lubricating oil is discharged.

When lubricating oil stored in the compressor (21) exceeds a set amount, lubricating oil is discharged. Thus, the excess of lubricating oil can be securely stored in the oil reserving part (91) so that oil collecting phenomena can be securely prevented.

Since the oil reserving part (91) has the oil separating faction, it also serves as an oil separator. This reduces the number of elements. Particularly, surplus lubricating oil can be securely discharged from the internal end position of the oil equalizing bypass pipe (93, 94, . . . ) so that the structure can be simplified.

Since oil equalizing operation is performed in a cooling cycle at the cooling operation and in a heating cycle at the heating operation, oil equalizing operation is performed in the same cycle as in normal temperature control operation. Accordingly, no variation in refrigerant flow or the like occurs so that oil equalizing operation can be readily performed.

Further, since surplus lubricating oil is discharged by the pressure equalizing control means (81), lack in lubricating oil can be prevented without any oil level sensor and at the same time oil collecting phenomena can be prevented.

Since oil equalization can be simultaneously preformed in dual directions between the thermal source units (2A, 2B, . . . ), oil equalizing operation can be completed in a short time.

When reverse-cycle defrosting operation is performed in heating operation in such a manner that high-pressure gas refrigerant is fed from one of the thermal source units (2A, 2B, . . . ) to the other one with use of the pressure equalizing line (6E) and the gas bypass passage (95, 96, . . . ), the defrosting operation and oil equalizing operation can be simultaneously performed. Accordingly, since it is not necessary to separately perform oil equalizing operation, normal temperature control operation can be performed with efficiency.

BEST MODE FOR CARRYING OUT THE INVENTION

Below, description is made about embodiments of this invention with reference to the drawings.

<Embodiment 1>

Figure 1:
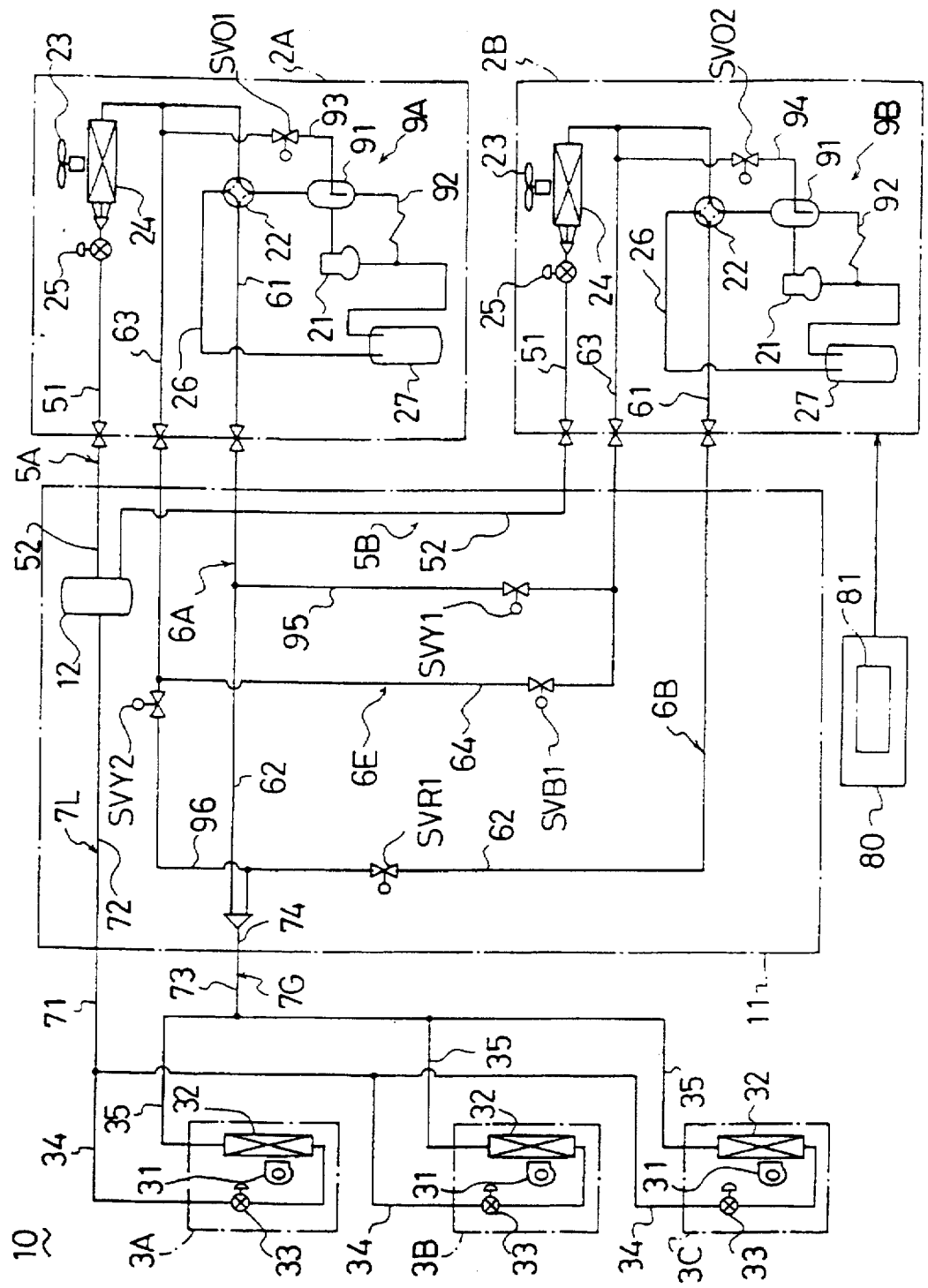
FIG. 1 is a refrigerant circuit diagram showing an air conditioner of this invention.

As shown in FIG. 1, an air conditioner (10) is so composed that two outdoor units (2A, 2B) and three indoor units (3A, 3B, 3C) are connected in parallel to a main liquid line (7L) and are connected in parallel to a main gas line (7G).

Each of the first outdoor unit (2A) and second outdoor unit (2B) has a compressor (21), a four-way selector valve (22), an outdoor heat exchanger (24) as a thermal-source-side heat exchanger in the vicinity of which an outdoor fan (23) is disposed, and an outdoor motor-operated expansion valve (25) as an expansion mechanism, and forms a thermal source unit reversibly operable between a cooling cycle and a heating cycle. The outdoor heat exchanger (24) is connected at a gas refrigerant side end thereof to a refrigerant piping section (26) and is connected at the other end of liquid refrigerant side to a liquid line (5A, 5B).

The refrigerant piping section (26) is connected to the suction side and discharge side of the compressor (21) so as to be switchable therebetween by the four-way selector valve (22). Further, a gas line (6A, 6B) is connected, through the refrigerant piping section (26), to the suction side and discharge side of the compressor (21) so as to be switchable therebetween by the four-way selector valve (22). The gas line (6A, 6B) is connected to the main gas line (7G). An accumulator (27) is provided in the refrigerant piping section (26), between the suction side of the compressor (21) and the four-way selector valve (22).

Each capacity of the outdoor units (2A, 2B) is set according to the number of indoor units (3A, 3B, 3C) connected thereto. The compressor (21) of the first outdoor unit (2A) is composed so as to be operable by inverter control. The compressor (21) of the second outdoor units (2B) is composed so as to be switchably operable among capacities of 100%, 50% and 0% by unload control. Each of the compressors (21) is controlled based on control signals from a controller (80).

Each of the indoor unit (3A, 3B, 3C) has an indoor heat exchanger (32) as a used-side heat exchanger in the vicinity of which an indoor fan (31) is disposed and an indoor motor-operated expansion valve (33), and forms a user unit. The indoor heat exchangers (32) are connected in parallel to the main liquid line (7L) and the main gas line (7G) through an indoor liquid duct (34) and an indoor gas duct (35), respectively. The indoor motor-operated expansion valve (33) is provided in the indoor liquid duct (34).

Meanwhile, the air conditioner (10) is provided with a piping unit (11). In the piping unit (11), the liquid lines (5A, 5B) of the outdoor units (2A, 2B) are connected to the main liquid line (7L) and the gas lines (6A, 6B) of the outdoor units (2A, 2B) are connected to the main gas line (7G).

In detail, each of the liquid lines (5A, 5B) is composed of a liquid pipe (51) extending outside from the outdoor unit (2A, 2B) and a liquid passage (52) connecting to an outer end of the liquid pipe (51). The liquid pipe (51) is connected at an inner end thereof to the outdoor heat exchanger (24) and is provided with the outdoor motor-operated expansion valve (25). The liquid passage (52) is connected to the mail liquid line (7L) through a receiver (12).

Each of the gas lines (6A, 6B) is composed of a gas pipe (61) extending outside from the outdoor unit (2A, 2B) and a gas passage (62) connecting to an outer end of the gas pipe (61). The gas pipe (61) is connected to the compressor (21) through the four-way selector valve (22) and the refrigerant piping section (26).

The main liquid line (7L) is composed of a main liquid pipe (71) extending toward the indoor units (3A, 3B, 3C) and a main liquid passage (72) which connects to an end of the main liquid pipe (71) and to which the liquid passages (52) of the outdoor units (2A, 2B) connect through the receiver (12). The indoor liquid ducts (34) of the indoor units (3A, 3B, 3C) are connected to the other end of the main liquid pipe (71).

The main gas line (7G) is composed of a main gas pipe (73) extending toward the indoor units (3A, 3B, 3C) and a main gas passage (74) which connects to an end of the main gas pipe (73) and to which the gas passages (62) of the outdoor units (2A, 2B) connect. The indoor gas ducts (35) of the indoor units (3A, 3B, 3C) are connected to the other end of the main gas pipe (73).

The liquid passages (52) of the liquid lines (5A, 5B) of the outdoor units (2A, 2B), the gas passages (62) of the gas lines (6A, 6B) of the outdoor units (2A, 2B), the main liquid passage (72) of the main liquid line (7L), the main gas passage (74) of the main gas line (7G) and the receiver (12) are integrally formed so that they are unitized into the piping unit (11).

Further, a gas stop valve (SVR1) is also integrally united in the piping unit (11). The gas stop valve (SVR1) is disposed in the gas passage (62) of the gas line (6B) extending from the second outdoor unit (2B) to open and close the gas passage (62), and is so composed as to fully close based on control signals of the controller (80) at the deactivation of the second outdoor unit (2B) in heating operation.

The outdoor motor-operated expansion valve (25) of the second outdoor unit (2B) is so composed as to fully close based on control signals of the controller (80) at the deactivation of the second outdoor unit (2B) in cooling operation and heating operation.

A pressure equalizing line (6E) is provided between the first outdoor unit (2A) and the second outdoor unit (2B).

The pressure equalizing line (6E) is connected at an end thereof to the gas refrigerant side of the refrigerant piping section (26) of the outdoor heat exchanger (24) of the first outdoor unit (2A) and is connected at the other end thereof to the gas refrigerant side of the refrigerant piping section (26) of the outdoor heat exchanger (24) of the second outdoor unit (2B), so as to allow dual-directional refrigerant communication.

The pressure equalizing line (6E) is so composed that respective outer ends of pressure equalizing pipes (63) extending outside from the respective outdoor units (2A, 2B) are connected to a pressure equalizing passage (64). The pressure equalizing passage (64) is provided with a pressure equalizing valve (SVB1) which is fully closed at the deactivation of the second outdoor unit (2B) in cooling operation to block refrigerant communication toward the second outdoor unit (2B).

The pressure equalizing passage (64) and the pressure equalizing valve (SVB1) are integrated into the piping unit (11) so as to be unitized.

As one of features of this invention, there are provided, between the first outdoor unit (2A) and second outdoor unit (2B), the first oil equalization mechanism (9A) for conducting lubricating oil discharged from the compressor (21) of the first outdoor unit (2A) to the suction side of the compressor (21) of the second outdoor unit (2B) and the second oil equalization mechanism (9B) for conducting lubricating oil discharged from the compressor (21) of the second outdoor unit (2B) to the suction side of the compressor (21) of the first outdoor unit (2A), and the controller (80) is provided with an oil equalizing control means (81).

Each of the oil equalization mechanism (9A, 9B) has an oil reserving part (91), an oil equalizing bypass passage (93, 94) and a gas bypass passage (95, 96). The oil reserving part (91) is disposed in the refrigerant piping section (26) connected to the discharge side of the compressor (21) so as to store lubricating oil discharged from the compressor (21) and also serves as an oil separator having an oil separating function of separating lubricating oil from refrigerant. The bottom of the oil reserving part (91) is connected to an oil backing pipe (92), which has a capillary, for returning lubricating oil to the compressor (21).

Each of the oil equalizing bypass pipes (93, 94) is connected at an end thereof to the oil reserving part (91) and is connected at the other end thereof to the pressure equalizing pipe (63) of the pressure equalizing line (6E). Each of the oil equalizing bypass pipes (93, 94) has an oil equalizing valve (SVO1, SVO2) so as to derive only a surplus above a set amount of storage out of lubricating oil stored in the oil reserving part (91).

In detail, one end of each oil equalizing bypass pipe (93, 94) is introduced into the oil reserving part (91). The introduced end of the oil equalizing bypass pipe (93, 94) is located at the level higher by a set height than the bottom of the oil reserving part (91). Specifically, while a set amount out of lubricating oil stored in the oil reserving part (91) is returned to the compressor (21) through the oil backing pipe (92), surplus lubricating oil accumulates in the oil reserving part (91). When an amount of storage of lubricating oil exceeds the set level in the oil reserving part (91) so that surplus lubricating oil accumulates, only the surplus lubricating oil above the set amount of storage flows out through the oil equalizing bypass pipe (93, 94).

Both the gas bypass passages (95, 96) are integrated into the piping unit (11). The first gas bypass passage (95) is connected at an end thereof to the second outdoor unit (2B) side from the pressure equalizing valve (SVB1) of the pressure equalizing passage (64), is connected at the other end thereof to the gas passage (62) of a first outdoor unit (2A), and has a first bypass valve (SVY1).

The second gas bypass passage (96) is connected at an end thereof to the first outdoor unit (2A) side from the pressure equalizing valve (SVB1) of the pressure equalizing passage (64), is connected at the other end thereof to the gas passage (62) of the second outdoor unit (2B), and has a second bypass valve (SVY2).

Further, the oil equalizing control means (81) is so composed as to perform, in normal operation, 2 to 3 minutes oil equalizing operation once in every 2 to 3 hours and to perform oil equalizing operation after oil backing operation and after defrosting operation in heating operation. The oil equalizing control means (81) controls the respective gas bypass passages (95, 96) and the respective oil equalizing bypass pipes (93, 94) between their communication states and their interruption states in order that lubricating oil flows alternately between the outdoor units (2A, 2B) in cooling cycle operation.

In detail, the oil equalizing control means (81) is so composed as to perform first oil equalizing operation of opening the first oil equalizing valve (SVO1) and the second bypass valve (SVY2) with closing the pressure equalizing valve (SVB1) to conduct lubricating oil from the first outdoor unit (2A) to the second outdoor unit (2B), and perform second oil equalizing operation of opening the second oil equalizing valve (SVO2) and the first bypass valve (SVY1) with closing the pressure equalizing valve (SVB1) to conduct lubricating oil from the second outdoor unit (2B) to the first outdoor unit (2A).

In addition, the oil equalizing control means (81) controls the respective oil equalizing bypass pipes (93, 94) between their communication states and their interruption states in order that lubricating oil flows alternately between the outdoor units (2A, 2B) in heating cycle operation, and holds the downstream sides of the oil equalization mechanisms (9A, 9B) in low-pressure condition.

In detail, the oil equalizing control means (81) is so composed as to perform first oil equalizing operation of opening the pressure equalizing valve (SVB1) and the first oil equalizing valve (SVO1) with closing the respective bypass valves (SVY1, SVY2) and the second oil equalizing valve (SVO2) and simultaneously adjusting the outdoor motor-operated expansion valve (25) of the second outdoor unit (2B) into a small opening, thereby conducting lubricating oil from the first outdoor unit (2A) to the second outdoor unit (2B). Further, the oil equalizing control means (81) is so composed as to perform second oil equalizing operation of opening the pressure equalizing valve (SVB1) and the second oil equalizing valve (SVO2) with closing the respective bypass valves (SVY1, SVY2) and the first oil equalizing valve (SVO1) and simultaneously adjusting the outdoor motor-operated expansion valve (25) of the first outdoor unit (2A) into a small opening, thereby conducting lubricating oil from the second outdoor unit (2B) to the first outdoor unit (2A).

Next, description is made about reasons for the provision of the oil equalization mechanisms (9A, 9B).

Figure 6:
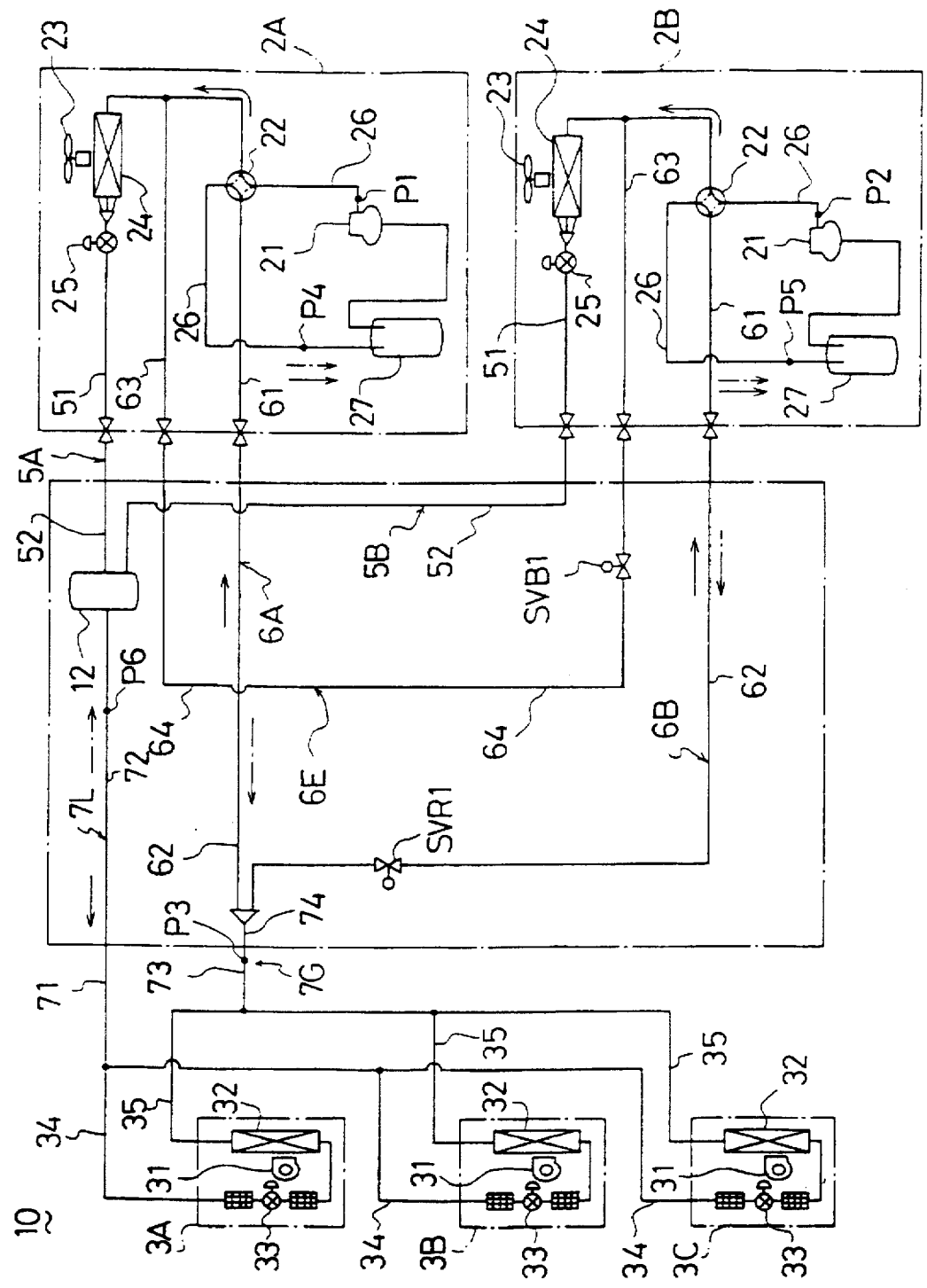
FIG. 6 is a refrigerant circuit diagram for explaining oil collecting phenomena.

As shown in FIG. 6, if the oil reserving part (91), the oil equalizing bypass pipes (93, 94) and the gas bypass passages (95, 96) are not provided and oil equalizing operation is not performed, the four-way selector valve (22) is switched as shown in the broken line in heating operation so that refrigerant circulates as shown in the dot-dash line. Supposing that an amount of circulation of refrigerant GR on the discharge side P1 of the compressor (21) of the first outdoor unit (2A) is 84 Kg/h and an oil discharge ratio LO as a content of lubricating oil in the gas refrigerant of the discharge side P1 is 0.1%, an amount of discharge of lubricating oil LD is 0.084 Kg/h. Supposing that an amount of circulation of refrigerant GR on the discharge side P2 of the compressor (21) of the second outdoor unit (2B) is 293 Kg/h and an oil discharge ratio LO as a content of lubricating oil in the gas refrigerant of the discharge side P2 is 0.5%, an amount of discharge of lubricating oil LD is 1.47 Kg/h.

Consequently, at a point P3 of the main gas line (7G) at which refrigerant is confluent, an amount of circulation of refrigerant GR is 377 Kg/h, an oil discharge ratio LO is 0.412% and an amount of circulation of lubricating oil LD is 1.554 Kg/h. If lubricating oil is suctioned into the compressor (21) by the same amount as the amount of circulation of the discharged refrigerant GR, an amount of circulation of refrigerant GR on the suction side P4 of the compressor (21) of the first outdoor unit (2A) is 84 Kg/h and an oil discharge ratio LO on the suction side P4 is 0.412% so that an amount of backing lubricating oil LS becomes 0.346 Kg/h. On the other hand, an amount of circulation of refrigerant GR on the suction side P5 of the compressor (21) of the second outdoor unit (2B) is 293 Kg/h and an oil discharge ratio LO on the suction side P4 is 0.412% so that an amount of backing lubricating oil LS becomes 1.21 Kg/h.

As a result, only 1.21 Kg/h lubricating oil is returned to the second outdoor unit (2B) in spite of 1.47 Kg/h discharged lubricating oil so that lack in lubricating oil may occur.

Further, the four-way selector valve (22) is switched as shown in the solid line in cooling operation so that refrigerant circulates as shown in the solid line. Supposing that an amount of circulation of refrigerant GR on the discharge side P1 of the compressor (21) of the first outdoor unit (2A) is 84 Kg/h and an oil discharge ratio LO in the gas refrigerant of the discharge side P1 is 0.1%, an amount of discharge of lubricating oil LD is 0.084 Kg/h. Supposing that an amount of circulation of refrigerant GR on the discharge side P2 of the compressor (21) of the second outdoor unit (2B) is 293 Kg/h and an oil discharge ratio LO in the gas refrigerant of the discharge side P2 is 0.5%, an amount of discharge of lubricating oil LD is 1.47 Kg/h.

Consequently, at a point P6 of the main liquid line (7L) at which refrigerant is confluent, an amount of circulation of refrigerant GR is 377 Kg/h, an oil discharge ratio LO is 0.412% and an amount of circulation of lubricating oil LD is 1.554 Kg/h. For the reason that gas refrigerant forms an annular flow when it is returned to the respective outdoor units (2A, 2B) and other reasons, lubricating oil may be evenly distributed. Thus, an amount of circulation of refrigerant GR on the suction side P4 of the compressor (21) of the first outdoor unit (2A) is 84 Kg/h so that an amount of backing lubricating oil LS becomes 0.777 Kg/h. On the other hand, an amount of circulation of refrigerant GR on the suction side P5 of the compressor (21) of the second outdoor unit (2B) is 293 Kg/h so that an amount of backing lubricating oil LS becomes 0.777 Kg/h.

As a result, only 0.777 Kg/h lubricating oil is returned to the second outdoor unit (2B) in spite of 1.47 Kg/h discharged lubricating oil so that lack in lubricating oil may occur.

To solve these problems, the above-mentioned oil equalization mechanisms (9A, 9B) are provided.

Operations of the Air Conditioner in Embodiment 1

Next, description is made about operations of the above air conditioner (10).

First, in cooling operation, the four-way selector valves (22) are switched as shown in the solid line of FIG. 1, and then high-pressure gas refrigerant discharged from the respective compressors (21) of the outdoor units (2A, 2B) is condensed by the respective outdoor heat exchangers (24) to turn liquid refrigerant. The liquid refrigerant is confluent in the main liquid passage (72), is reduced in pressure by the indoor motor-operated expansion valve (33) and is then evaporated by the indoor heat exchanger (32) to turn low-pressure gas refrigerant. The gas refrigerant is distributed to the respective gas passages (62) and is returned to the respective compressors (21) of the outdoor units (2A, 2B). This circulation is repeated.

On the other hand, in heating operation, the four-way selector valves (22) are switched as shown in the broken line of FIG. 1. High-pressure gas refrigerant discharged from the respective compressors (21) of the outdoor units (2A, 2B) is confluent in the main gas passage (74) and is then condensed by the indoor heat exchanger (32) to turn liquid refrigerant. The liquid refrigerant is distributed to the respective liquid passages (52) of the outdoor units (2A, 2B) through the main liquid passage (72). Then, the liquid refrigerant is reduced in pressure by the respective outdoor motor-operated expansion valves (25) and is then evaporated by the respective outdoor heat exchangers (24) to turn low-pressure gas refrigerant. The gas refrigerant is returned to the respective compressors (21) of the outdoor units (2A, 2B). This circulation is repeated.

In the cooling operation and heating operation, the controller (80) controls the respective openings of the indoor motor-operated expansion valves (33) and the respective openings of the outdoor motor-operated expansion valves (25) and controls the respective capacities of the compressors (21) of the outdoor units (2A, 2B) in accordance with indoor load. When the indoor units (3A, 3B, 3C) are reduced in load so that the capacity of the first outdoor unit (2A) can deal singly with the cooling operation or heating operation, the second outdoor unit (2B) is deactivated.

Further, in either of cooling operation and heating operation, the pressure equalizing valve (SVB1) is opened when both the outdoor units (2A, 2B) are operated. In cooling operation, high-pressure gas refrigerant flows through both the outdoor heat exchangers (24) at an approximately uniform flow rate. In heating operation, low-pressure gas refrigerant flows through both the outdoor heat exchangers (24) at an approximately uniform flow rate.

For example, when a capacity of the second outdoor unit (2B) becomes large as compared with the load in cooling operation, a part of refrigerant discharged from the compressor (21) passes through the pressure equalizing line (6E) and then flows into the outdoor heat exchanger (24) of the first outdoor unit (2A).

On the other hand, when a capacity of the second outdoor unit (2B) becomes large as compared with the load in heating operation, a part of refrigerant flows from the outdoor heat exchanger (24) of the first outdoor unit (2A) to the oil equalizing line (6E) and then is suctioned into the compressor (21) of the second outdoor unit (2B).

When the second outdoor unit (2B) is deactivated in cooling operation, the pressure equalizing valve (SVB1) is fully closed. When the second outdoor unit (2B) is deactivated in heating operation, the pressure equalizing valve (SVB1) is held opened.

Further, when the second outdoor unit (2B) is deactivated in heating operation, the gas stop valve (SVR1) is closed. When the second outdoor unit (2B) is deactivated in cooling operation and heating operation, the outdoor motor-operated expansion valve (25) of the second outdoor unit (2B) is fully closed. Thereby, it is prevented that liquid refrigerant is stored in the second outdoor unit (2B) in deactivation.

In the above cooling operation and heating operation, the bypass valves (SVY1, SVY2) and the oil equalizing valves (SVO1, SVO2) are closed.

As one of features of this invention, the present embodiment is so composed that oil equalizing operation is performed in either of cooling operation and heating operation so that an amount of lubricating oil is equalized between the compressors (21) of the outdoor units (2A, 2B).

Figure 2:
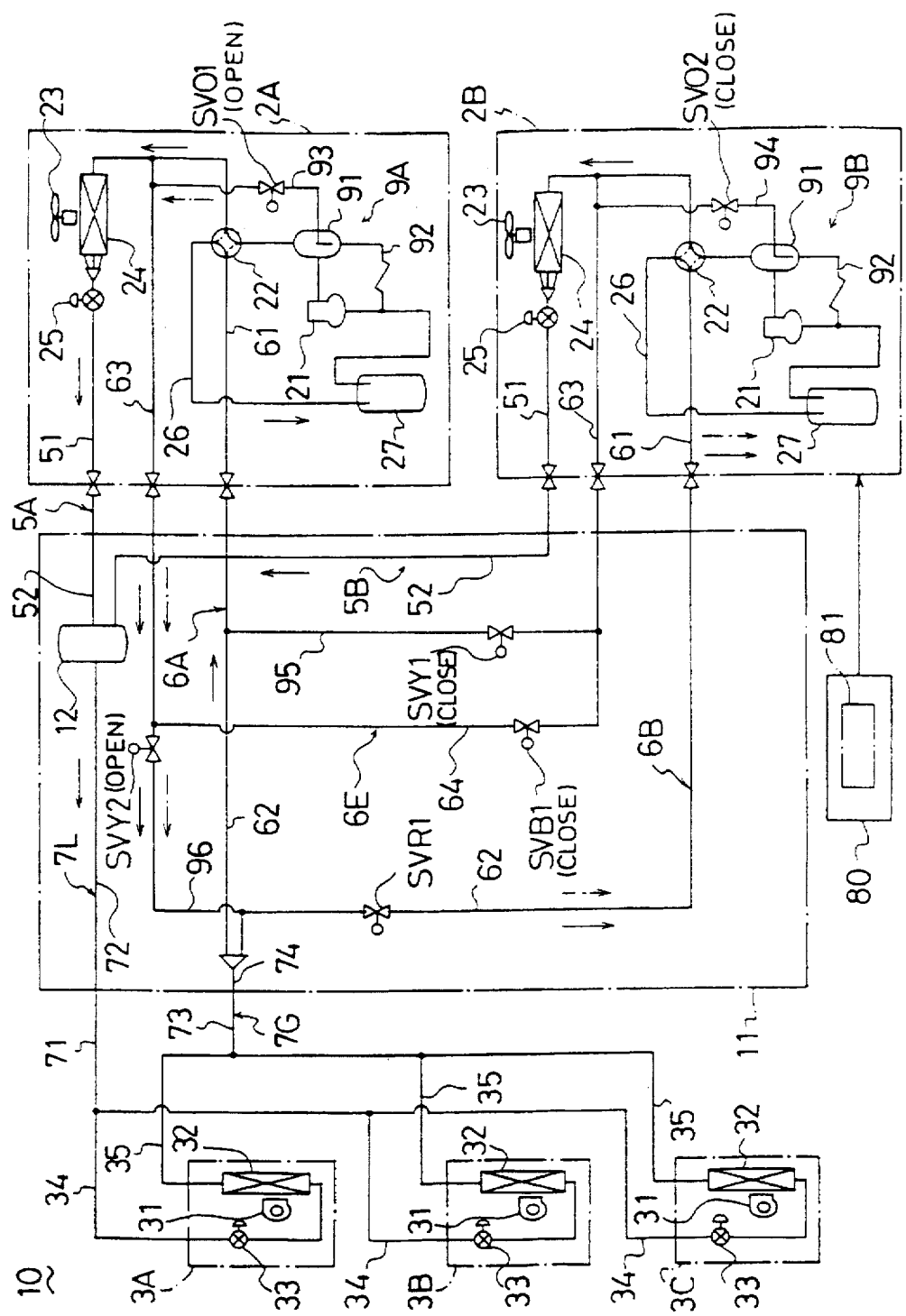
FIG. 2 is a refrigerant circuit diagram showing oil equalizing operation in cooling operation.
Figure 3:
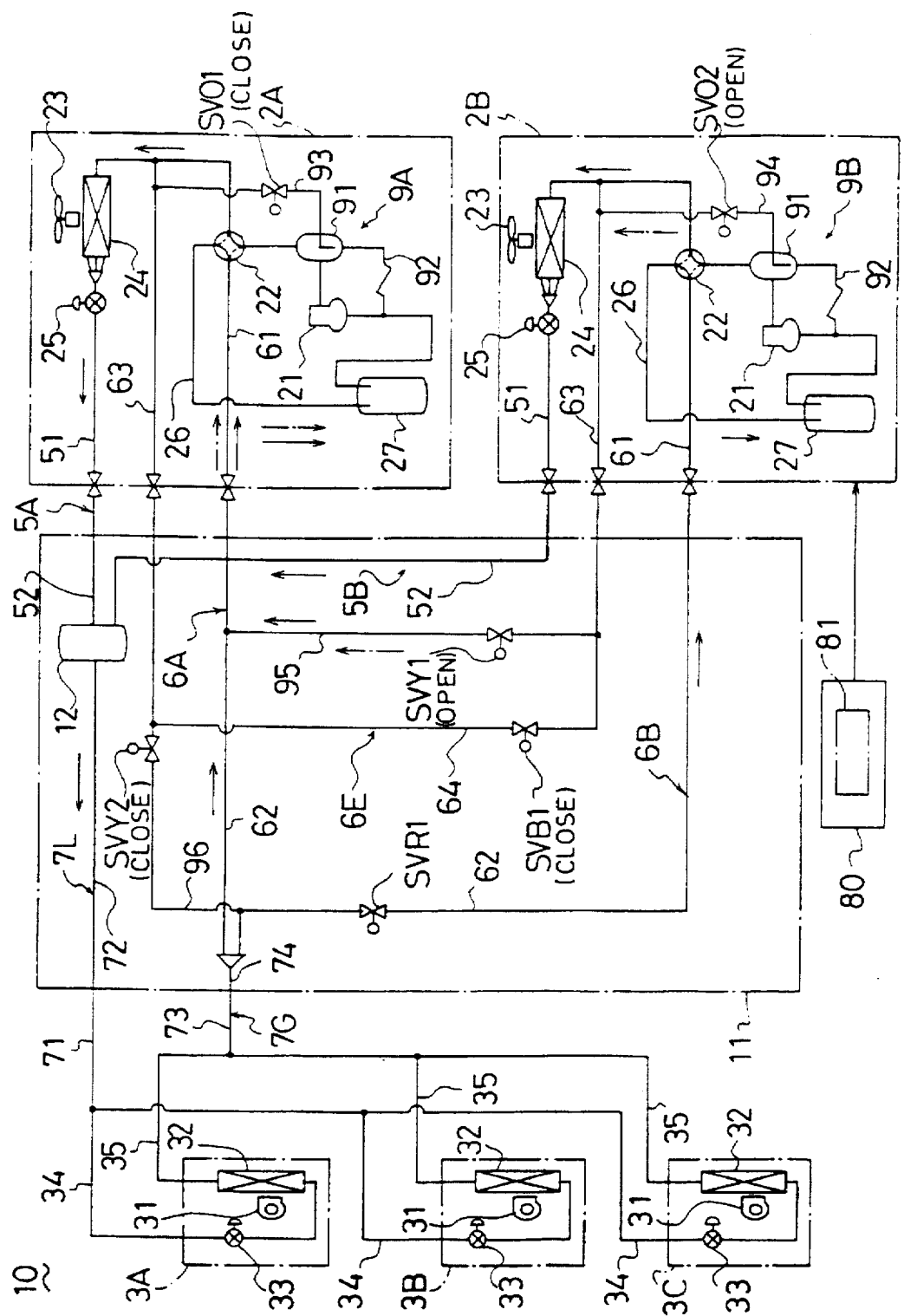
FIG. 3 is a refrigerant circuit diagram showing another oil equalizing operation in cooling operation.

More specifically, in cooling operation, oil equalizing operation is performed as shown in FIGS. 2 and 3. In these figures, a solid arrow shows refrigerant and a dot-dash arrow shows lubricating oil.

First, as shown in FIG. 2, first oil equalizing operation is performed. That is, the first oil equalizing valve (SVO1) and the second bypass valve (SVY2) are opened with the pressure equalizing valve (SVB1) closed, and the second oil equalizing valve (SVO2) and the first bypass valve (SVY1) are closed.

In this state, a surplus out of lubricating oil stored in the oil reserving part (91) of the first outdoor unit (2A) passes from the first oil equalizing bypass pipe (93) to the pressure equalizing line (6E), flows into the gas line (6B) via the second gas bypass passage (96) and is then introduced into the compressor (21) of the second outdoor unit (2B). In this manner, lubricating oil is conducted from the first outdoor unit (2A) to the second outdoor unit (2B).

Thereafter, as shown in FIG. 3, second oil equalizing operation is performed. That is, the second oil equalizing valve (SVO2) and the first bypass valve (SVY1) are opened with the pressure equalizing valve (SVB1) closed, and the first oil equalizing valve (SVO1) and the second bypass valve (SVY2) are closed.

In this state, a surplus out of lubricating oil stored in the oil reserving part (91) of the second outdoor unit (2B) passes from the second oil equalizing bypass pipe (94) to the pressure equalizing line (6E), flows into the gas line (6A) via the first gas bypass passage (95) and is then introduced into the compressor (21) of the first outdoor unit (2A). In this manner, lubricating oil is conducted from the second outdoor unit (2B) to the first outdoor unit (2A).

Oil equalization is performed between the outdoor units (2A, 2B) in such a manner that the above operation is repeated.

Figure 4:
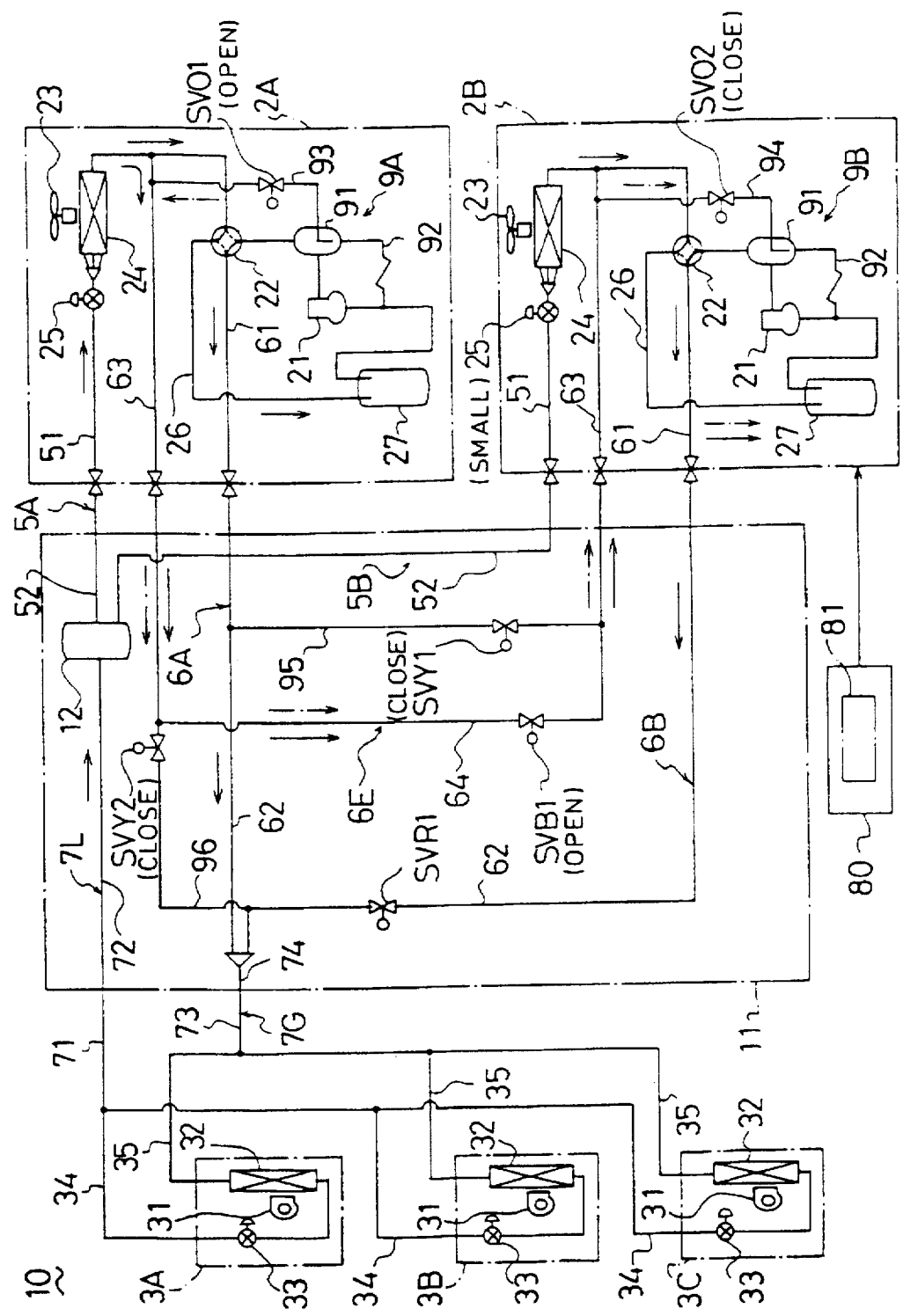
FIG. 4 is a refrigerant circuit diagram showing oil equalizing operation in heating operation.
Figure 5:
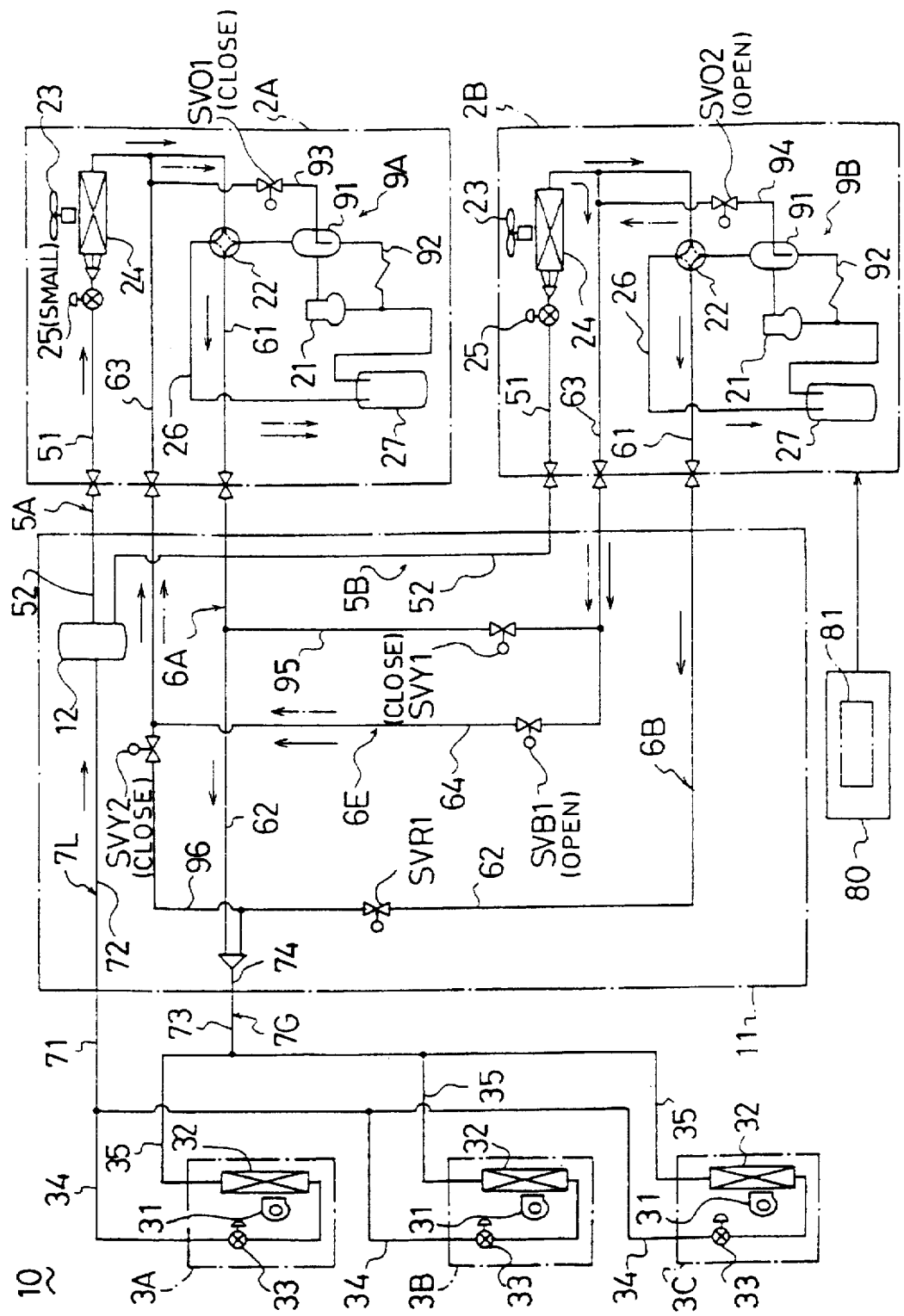
FIG. 5 is a refrigerant circuit diagram showing another oil equalizing operation in heating operation.

On the other hand, in heating operation, oil equalizing operation is performed as shown in FIGS. 4 and 5. In these figures, a solid arrow shows refrigerant and a dot-dash arrow shows lubricating oil.

First, as shown in FIG. 4, first oil equalizing operation is performed. That is, the first oil equalizing valve (SVO1) and the pressure equalizing valve (SVB1) are opened with the first bypass valve (SVY1) and the second bypass valve (SVY2) closed, and the second oil equalizing valve (SVO2) is closed. Then, the opening of the motor-operated expansion valve (25) of the second outdoor unit (2B) is set to be slightly small so that the second outdoor unit (2B) side of the pressure equalizing line (6E) is held in a low pressure.

In this state, a surplus out of lubricating oil stored in the oil reserving part (91) of the first outdoor unit (2A) passes from the first oil equalizing bypass pipe (93) to the pressure equalizing line (6E) and is then introduced into the compressor (21) of the second outdoor unit (2B). In this manner, lubricating oil is conducted from the first outdoor unit (2A) to the second outdoor unit (2B).

Thereafter, as shown in FIG. 5, second oil equalizing operation is performed. That is, the second oil equalizing valve (SVO2) and the pressure equalizing valve (SVB1) are opened with the first bypass valve (SVY1) and the second bypass valve (SVY2) closed, and the first oil equalizing valve (SVO1) is closed. Then, the opening of the motor-operated expansion valve (25) of the first outdoor unit (2A) is set to be slightly small so that the first outdoor unit (2A) side of the pressure equalizing line (6E) is held in a low pressure.

In this state, a surplus out of lubricating oil stored in the oil reserving part (91) of the second outdoor unit (2B) passes from the second oil equalizing bypass pipe (94) to the pressure equalizing line (6E) and is then introduced into the compressor (21) of the first outdoor unit (2A). In this manner, lubricating oil is conducted from the second outdoor unit (2B) to the first outdoor unit (2A).

Oil equalization is performed between the outdoor units (2A, 2B) in such a manner that the above operation is repeated.

The above oil equalizing operation is made for 2 to 3 minutes in every 2 to 3 hours, and is also made after the completion of oil backing operation and after the completion of defrosting operation.

Effects of Oil Equalizing Operation in Embodiment 1

As described above, according to the present embodiment, since lubricating oil is conducted from the high pressure side as the discharge side of the compressor (21) of one outdoor unit (2A, 2B) to the low-pressure side of the other outdoor unit (2A, 2B), there can be securely prevented oil collecting phenomena that lubricating oil is collected to one of the outdoor units (2A, 2B).

As a result, lack in lubricating oil can be securely prevented so that secure normal temperature control operation can be continued.

Further, since surplus lubricating oil which is stored in the oil reserving part (91) and exceeds a set amount of storage, is discharged from the oil separator (43), oil collecting phenomena can be securely eliminated so that normal temperature control operation can be continued more securely.

In particular, oil collecting phenomena can be prevented while lack in lubricating oil can be prevented in each outdoor unit (2A, 2B) from which lubricating oil is discharged.

Further, since the oil reserving part (91) has the oil separating function, it also serves as an oil separator thereby accomplishing reduction in number of elements. In particular, since surplus lubricating oil can be securely discharged from the internal end positions of the respective oil equalizing bypass pipes (93, 94, . . . ), the structure can be simplified.

Furthermore, since oil equalizing operation is performed in a cooling cycle at the cooling operation and in a heating cycle at the heating operation, oil equalizing operation is performed in the same cycle as in normal temperature control operation. Accordingly, no variation in refrigerant flow or the like occurs so that oil equalizing operation can be readily performed.

Further, since surplus lubricating oil is discharged by the pressure equalizing control means (81), lack in lubricating oil can be prevented without any oil level sensor and at the same time oil collecting phenomena can be prevented.

Modifications of Embodiment 1

As for the oil equalizing operation in heating operation in the above embodiment, the opening of the motor-operated expansion valve (25) of the second outdoor unit (2B) to which lubricating oil is returned in first oil equalizing operation is set to be slightly small and the opening of the motor-operated expansion valve (25) of the first outdoor unit (2A) to which lubricating oil is returned in second oil equalizing operation is set to be slightly small. However, the motor-operated expansion valve (25) of the second outdoor unit (2B) in first oil equalizing operation may be fully closed and the motor-operated expansion valve (25) of the first outdoor unit (2A) in second oil equalizing operation may be fully closed. Thus, oil equalization can be promptly performed.

Alternatively, as for the oil equalizing operation in heating operation, the motor-operated expansion valve (25) of the first outdoor unit (2A) from which lubricating oil is discharged in first oil equalizing operation may be slightly large in opening or fully opened and the motor-operated expansion valve (25) of the second outdoor unit (2B) from which lubricating oil is discharged in second oil equalizing operation may be slightly large in opening or fully opened. Thus, slightly moist refrigerant flows through the pressure equalizing line (6E) so that lubricating oil can be smoothly delivered.

<Embodiment 2>

The oil equalizing operation in cooling operation in the above embodiment is so performed that the operations of FIGS. 2 and 3 are repeated. Alternatively, as another embodiment, the oil equalizing control means (81) may simultaneously perform the first oil equalizing operation of FIG. 2 and the second oil equalizing operation of FIG. 3.

In detail, with the pressure equalizing valve (SVB1) closed, the first oil equalizing valve (SVO1), the second oil equalizing valve (SVO2), the first bypass valve (SVY1) and the second bypass valve (SVY2) are opened.

In this state, a surplus out of lubricating oil stored in the oil reserving part (91) of the first outdoor unit (2A) passes from the first oil equalizing bypass pipe (93) to the pressure equalizing line (6E), flows into the gas line (6B) via the second gas bypass passage (96) and is then introduced into the compressor (21) of the second outdoor unit (2B). At the same time, a surplus out of lubricating oil stored in the oil reserving part (91) of the second outdoor unit (2B) passes from the second oil equalizing bypass pipe (94) to the pressure equalizing line (6E), flows into the gas line (6A) via the first gas bypass passage (95) and is then introduced into the compressor (21) of the first outdoor unit (2A).

As a result, lubricating oil is delivered mutually between the first outdoor unit (2A) and second outdoor unit (2B).

According to this modification, oil equalizing operation can be completed in a short time.

<Embodiment 3>

The above air conditioner (10) performs defrosting operation in heating operation. As still another embodiment, the air conditioner (10) may simultaneously perform the defrosting operation and oil equalizing operation.

More specifically, in the case that the outdoor heat exchanger (24) of the first outdoor unit (2A) is frosted, the first outdoor unit (2A) and second outdoor unit (2B) are operated in a cooling cycle, the first bypass valve (SVY1) is opened and the second bypass valve (SVY2) is closed.

At the time, the gas stop valve (SVR1) is opened, and the pressure equalizing valve (SVB1) and the outdoor motor-operated expansion valve (25) of the second outdoor unit (2B) are fully closed.

As a result, while high-pressure gas refrigerant discharged from the compressor (21) of the first outdoor unit (2A) is fed to the frosted outdoor heat exchanger (24), high-pressure gas refrigerant discharged from the compressor (21) of the second outdoor unit (2B) is fed to the compressor (21) of the first outdoor unit (2A) through the pressure equalizing line (6E), the first bypass passage (95) and the gas passage (62).

Then, the suctioned gas refrigerant of the compressor (21) of the first outdoor unit (2A) is increased in temperature so that the discharged gas refrigerant of the compressor (21) of the first outdoor unit (2A) is increased in temperature, thereby promptly performing the defrosting of the first outdoor unit (2A).

At this time, by opening the second oil equalizing valve (SVO2), oil equalizing operation is simultaneously performed for conducting lubricating oil from the second outdoor unit (2B) to the first outdoor unit (2A).

On the contrary, in the case that the second outdoor unit (2B) is frosted, the second bypass valve (SVY2) is opened, the first bypass valve (SVY1) is closed, and defrosting operation is made in the opposite manner to the above operation. Thus, high-pressure gas refrigerant discharged from the compressor (21) of the first outdoor unit (2A) is fed to the compressor (21) of the second outdoor unit (2B) through the pressure equalizing line (6E), the second bypass passage (96) and the gas passage (62). Then, the discharged gas refrigerant of the compressor (21) of the second outdoor unit (2B) is increased in temperature so that the defrosting of the second outdoor unit (2B) is promptly performed.

At this time, by opening the first oil equalizing valve (SVO1), oil equalizing operation is simultaneously performed for conducting lubricating oil from the first outdoor unit (2A) to the second outdoor unit (2B).

Further, in the case that both the first outdoor unit (2A) and second outdoor unit (2B) are frosted, both the first bypass valve (SVY1) and second bypass valve (SVY2) are closed and both the first and second outdoor units (2A, 2B) are subjected to defrosting operation in cooling cycles. When defrosting operation is completed in one of the outdoor units (2A, 2B), one of the bypass valves (SVY1, SVY2) are opened.

For example, when defrosting operation is first completed in the second outdoor unit (2B), the first bypass valve (SVY1) is opened so that as mentioned above, high-temperature gas refrigerant is fed to the first outdoor unit (2A). At the same time, the second oil equalizing valve (SVO2) is opened so that oil equalizing operation is simultaneously performed for conducting lubricating oil from the second outdoor unit (2B) to the first outdoor unit (2A).

According to the present embodiment, since it is not necessary to perform oil equalizing operation separately, normal temperature control operation can be performed with efficiency.

<Embodiment 4>

Figure 7:
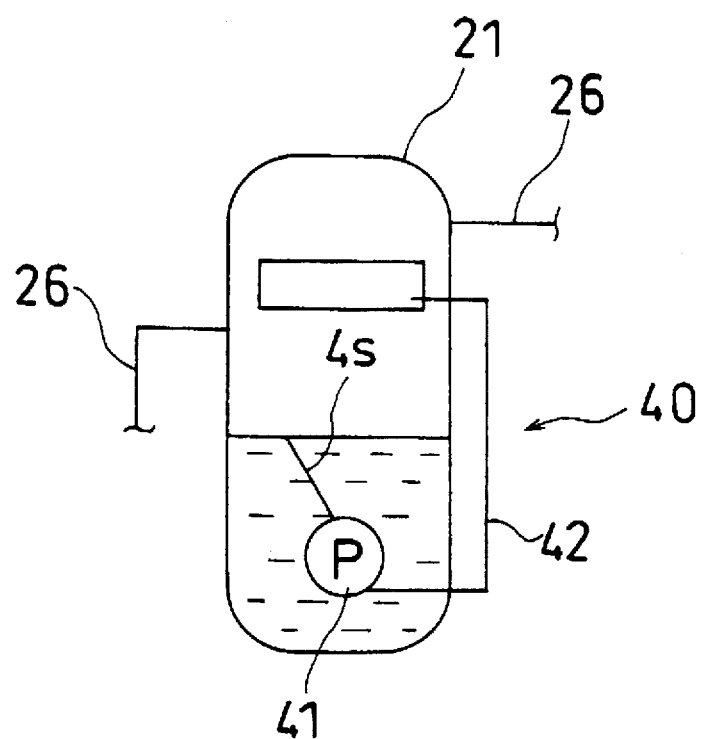
FIG. 7 is an enlarged circuit diagram showing a compressor of Embodiment 4.

The present embodiment is so composed that the compressor (21) in any one of Embodiments 1 to 3 has an oil discharge mechanism (40) shown in FIG. 7. In detail, each of the compressors (21, 21) shown in FIGS. 1 to 5 of Embodiment 1 has the oil discharge mechanism (40).

The oil discharge mechanism (40) is so composed as to discharge, when lubricating oil stored in a casing exceeds a set amount, the lubricating oil.

Figure 8:
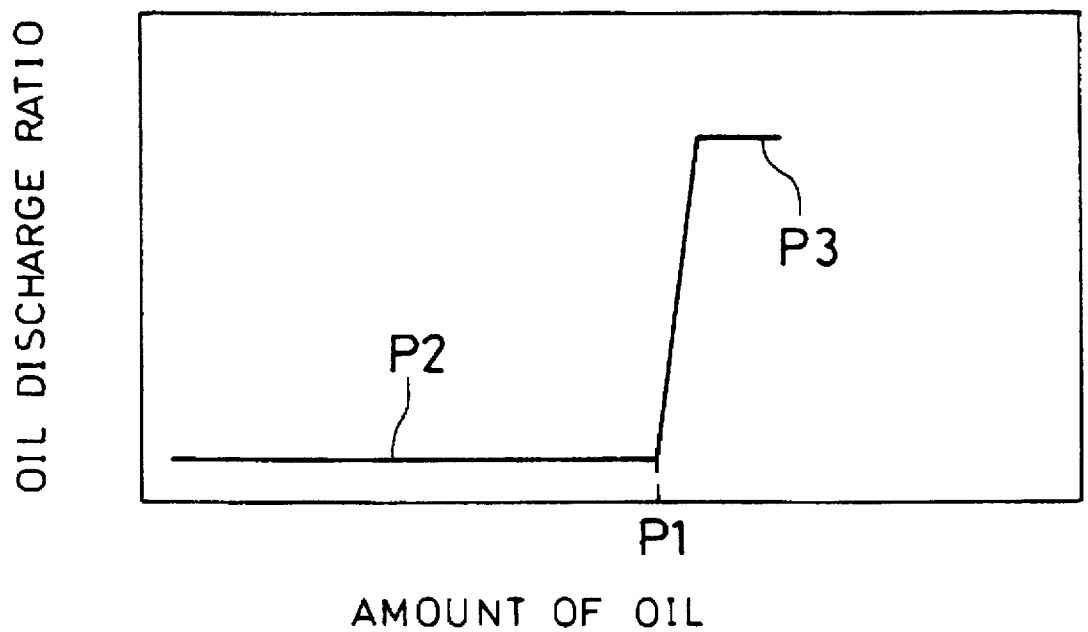
FIG. 8 is a graph showing characteristics of an oil discharge ratio with respect to an amount of storage of lubricating oil in an oil discharge mechanism.

In detail, the compressor (21) is a scroll compressor of low-pressure dome type, in which lubricating oil is accumulated at the bottom inside the casing. The oil discharge mechanism (40) has a discharge pump (41) disposed at the bottom inside the compressor (21). A suction port (4s) of the discharge pump (41) is set to a specified position. As shown in FIG. 8, the oil discharge mechanism (40) is so composed that when lubricating oil stored in the casing accumulates up to the level of the suction port (4s) to reach a set amount (See a point P1), the lubricating oil is conducted from the discharge pump (41) to a suction port of the scroll through a discharge pipe (42) so that a discharge amount of lubricating oil is abruptly increased.

That is, a certain amount of lubricating oil is discharged together with discharged refrigerant at a point P2 of FIG. 8 and a discharge amount of lubricating oil is abruptly increased at the point P1. Then, at a point P3, a certain amount of lubricating oil is discharged in accordance with the volume of the discharge pump (41).

By the oil discharge mechanism (40), an excess of lubricating oil above the set amount is increased in pressure by the scroll so as to be stored in the oil reserving part (91). As mentioned above, lubricating oil stored in the oil reserving part (91) is fed from the first outdoor unit (2A) to the second outdoor unit (2B) or from the second outdoor unit (2B) to the first outdoor unit (2A).

Thus, according to the present embodiment, since lubricating oil stored in the compressor (21) is discharged when it exceeds a set amount, the excess can be securely stored in the oil reserving part (91) so that oil collecting phenomena can be securely eliminated.

<Other Modifications>

In the air conditioner (10), the method of oil equalizing operation may be as follows. First, in a method of oil equalizing operation in cooling operation, when a set amount of lubricating oil is stored in the oil reserving part (91) of the first thermal source unit (2A), first oil equalizing operation is so performed that the stored lubricating oil is conducted to the suction side of the compressor (21) of the second thermal source unit (2B). Thereafter, when a set amount of lubricating oil is stored in the oil reserving part (91) of the second thermal source unit (2B), second oil equalizing operation is so performed that the stored lubricating oil is conducted to the suction side of the compressor (21) of the first thermal source unit (2A).

More specifically, for example, the first oil equalizing operation is so performed that out of lubricating oil stored in the oil reserving part (91) having the oil separating function, only an excess above a set amount of storage is conducted from the first thermal source unit (2A) to the suction side of the compressor (21) of the second thermal source unit (2B) through the oil equalizing bypass pipe (93). Subsequently, the second oil equalizing operation is so performed that out of lubricating oil stored in the oil reserving part (91) having the oil separating function, only an excess above a set amount of storage is conducted from the second thermal source unit (2B) to the suction side of the compressor (21) of the first thermal source unit (2A) through the oil equalizing bypass pipe (94).

Further, as another oil equalizing operation method in cooling operation, the above first oil equalizing operation and second oil equalizing operation may be performed at the same time. That is, out of lubricating oil stored in the oil reserving part (91) having the oil separating function of the first thermal source unit (2A), only surplus lubricating oil above a set amount of storage is conducted to the suction side of the compressor (21) of the second thermal source unit (2B) through the oil equalizing bypass pipe (93). At the same time, out of lubricating oil stored in the oil reserving part (91) having the oil separating function of the second thermal source unit (2B), only surplus lubricating oil above a set amount of storage is conducted to the suction side of the compressor (21) of the first thermal source unit (2A) through the oil equalizing bypass pipe (94).

In the above case that the first oil equalizing operation and second oil equalizing operation are sequentially preformed and the case that the first oil equalizing operation and second oil equalizing operation are performed simultaneously, the oil discharge mechanism (40) of the invention according to claim 3 may be applied. In detail, when lubricating oil stored in the compressor (21) exceeds a set amount, the oil discharge mechanism (40) discharges the excess above the set amount to the oil reserving part (91). Then, out of lubricating oil stored in the oil reserving part (91), only surplus lubricating oil above a set amount of storage is conducted from the first thermal source unit (2A) to the second thermal source unit (2B) or from the second thermal source unit (2B) to the first thermal source unit (2A).

On the other hand, a method of oil equalizing operation in heating operation is approximately equal to the method of oil equalizing operation in cooling operation. When a set amount of lubricating oil is stored in the oil reserving part (91) of the first thermal source unit (2A), first oil equalizing operation is so performed that the stored lubricating oil is conducted to the suction side of the compressor (21) of the second thermal source unit (2B). Thereafter, when a set amount of lubricating oil is stored in the oil reserving part (91) of the second thermal source unit (2B), second oil equalizing operation is so performed that the stored lubricating oil is conducted to the suction side of the compressor (21) of the first thermal source unit (2A).

More specifically, for example, the first oil equalizing operation is so performed that out of lubricating oil stored in the oil reserving part (91) having the oil separating function, only surplus lubricating oil above a set amount of storage is conducted from the first thermal source unit (2A) to the suction side of the compressor (21) of the second thermal source unit (2B) through the oil equalizing bypass pipe (93). Subsequently, the second oil equalizing operation is so performed that out of lubricating oil stored in the oil reserving part (91) having the oil separating function, only surplus lubricating oil above a set amount of storage is conducted from the second thermal source unit (2B) to the suction side of the compressor (21) of the first thermal source unit (2A) through the oil equalizing bypass pipe (94).

In the above case that the first oil equalizing operation and second oil equalizing operation are sequentially preformed, the oil discharge mechanism (4) of the invention according to claim 3 may be applied. In detail, when lubricating oil stored in the compressor (21) exceeds a set amount, the oil discharge mechanism (40) discharges the excess above the set amount of lubricating oil to the oil reserving part (91). Then, out of lubricating oil stored in the oil reserving part (91), only surplus lubricating oil above a set amount of storage is conducted from the first thermal source unit (2A) to the second thermal source unit (2B) or from the second thermal source unit (2B) to the first thermal source unit (2A).

The above embodiments disclose the air conditioner (10) reversibly switchable between a cooling cycle and a heating cycle. However, a cooling-only air conditioner may be applied to the inventions of claims 1 to 6 and a heating-only air conditioner may be applied to the inventions of claims 1, 2, 3, 7 and 8.

In the above embodiments, the number of outdoor units (2A, 2B) is two. However, the number of outdoor units to be provided in the air conditioner of this invention is not limited to two, or three or more outdoor units may be provided. For example, in the case that three outdoor units are provided, oil equalizing operation of Embodiment 1 or Embodiment 2 may be performed between the first outdoor unit and second outdoor unit and may be then performed between the first outdoor unit and third outdoor unit. Alternatively, oil equalizing operation may be sequentially performed between the first outdoor unit and second outdoor unit, between the second outdoor unit and third outdoor unit and between the third outdoor unit and first outdoor unit.

In the above embodiments, the number of indoor units (3A, 3B, 3C) is three. However, it is a matter of course that the number of indoor units is not limited to three, or a single indoor unit or four or more indoor units may be provided in the air conditioner of this invention.

Further, in the above embodiments, the oil reserving part (91) also serves as an oil separator. However, the oil reserving part may be an individual oil reservoir without serving as an oil separator and may be formed inside the compressor (21).

INDUSTRIAL APPLICABILITY

As described above, since the oil equalizing operation control device for air conditioner can securely prevent oil collecting phenomena, it is useful for air conditioners which are disposed in large-scale buildings or the like and have a plurality of thermal source units.

I claim:
1. For use with an air conditioner comprising:
   a plurality of thermal source units each having at least a compressor and a thermal-source-side heat exchanger;
   a main liquid line to which the plural thermal source units are connected in parallel with each other;
   a main gas line to which the plural thermal source units are connected in parallel with each other; and
   a user unit which has at least a used-side heat exchanger and which is connected to the main liquid line and the main gas line,
   in which refrigerant discharged from the compressor is condensed by one of the heat exchangers, is expanded by the expansion mechanism and is then evaporated by the other heat exchanger,
   an oil equalizing operation control device comprising oil equalization mechanisms for conducting lubricating oil stored in an oil reserving part provided on the discharge side of the compressor of each of the thermal source units to the suction side of the compressor of the other thermal source unit
   wherein the compressor has an oil discharge mechanism for discharging, when lubricating oil stored in the compressor exceeds a set amount, the excess of lubricating oil, and
   the oil equalization mechanisms each conduct only surplus lubricating oil above a set amount out of lubricating oil stored in the oil reserving part to the suction side of the compressor of the other thermal source unit.

2. An oil equalizing operation control device for air conditioner according to claim 1, wherein the oil equalization mechanisms each conduct only surplus lubricating oil above a set amount out of lubricating oil stored in the oil reserving part to the suction side of the compressor of the other thermal source unit.

3. An oil equalizing operation control device for air conditioner according to claim 1 or 2, wherein the oil reserving part has an oil separating function of separating lubricating oil from discharged refrigerant.

4. An oil equalizing operation control device for air conditioner according to claim 3, wherein
   the oil equalization mechanisms each have an oil equalizing bypass pipe for conducting lubricating oil from the oil reserving part to the suction side of the compressor of the other thermal source unit,
   an end of the oil equalizing bypass pipe is introduced into the oil reserving part, and
   the introduced end of the oil equalizing bypass pipe is located at the level higher by a set height than the bottom of the oil reserving part.

5. An oil equalizing operation control device for air conditioner according to claim 1 or 2, further comprising a pressure equalizing line which is connected at respective ends thereof to respective refrigerant piping sections connected to the gas refrigerant sides of the thermal-source-side heat exchangers of the respective thermal source units and allows interruptable communication of gas refrigerant in dual directions between the thermal source units, wherein the oil equalization mechanisms each have a gas bypass passage which is connected to the pressure equalizing line and a gas line of the corresponding thermal source unit and allows interruptable communication of lubricating oil, and an oil equalizing bypass pipe which is connected to the oil reserving part and the pressure equalizing line and allows interruptable communication of lubricating oil, and oil equalizing control means is provided for controlling the respective gas bypass passages and the respective oil equalizing bypass pipes between their communication states and their interruption states so that lubricating oil flows alternately between the thermal source units in cooling cycle operation.

6. An oil equalizing operation control device for air conditioner according to claim 5, wherein a first thermal source unit and a second thermal source unit are provided, the oil equalization mechanism of the first thermal source unit has a second gas bypass passage connected to the pressure equalizing line and the gas line of the second thermal source unit, and has a first oil equalizing bypass pipe connected to the oil reserving part of the first thermal source unit and the pressure equalizing line, the oil equalization mechanism of the second thermal source unit has a first gas bypass passage connected to the pressure equalizing line and the gas line of the first thermal source unit, and has a second oil equalizing bypass pipe connected to the oil reserving part of the second thermal source unit and the pressure equalizing line, and the oil equalizing control means is so composed as to perform a first oil equalizing operation for providing communication in the first oil equalizing bypass pipe and the second gas bypass passage and interrupting the second oil equalizing bypass passage and the first gas bypass passage to conduct lubricating oil from the first thermal source unit to the second thermal source unit and to perform a second oil equalizing operation for providing communication in the second oil equalizing bypass pipe and the first gas bypass passage and interrupting the first oil equalizing bypass pipe and the second gas bypass passage to conduct lubricating oil from the second thermal source unit to the first thermal source unit.

7. An oil equalizing operation control device for air conditioner according to claim 1 or 2, further comprising a pressure equalizing line which is connected at respective ends thereof to respective refrigerant piping sections connected to the gas refrigerant sides of the thermal-source-side heat exchangers of the respective thermal source units and allows interruptable communication of gas refrigerant in dual directions between the thermal source units, wherein the oil equalization mechanisms each have a gas bypass passage connected to the pressure equalizing line and a gas line of the corresponding thermal source unit and allows interruptable communication of lubricating oil, and an oil equalizing bypass pipe connected to the oil reserving part and the pressure equalizing line and allows interruptable communication of lubricating oil, and oil equalizing control means is provided for controlling the respective gas bypass passages and the respective oil equalizing bypass pipes between their communication states and their interruption states so that lubricating oil simultaneously flows in dual directions between the thermal source units in cooling operation.

8. An oil equalizing operation control device for air conditioner according to claim 1, 2 or 3, further comprising a pressure equalizing line which is connected at respective ends thereof to respective refrigerant piping sections connected to the gas refrigerant sides of the thermal-source-side heat exchangers of the respective thermal source units and allows interruptable communication of gas refrigerant in dual directions between the thermal source units, wherein the oil equalization mechanisms each have an oil equalizing bypass pipe connected to the pressure equalizing line and the oil reserving part, and oil equalizing control means is provided for controlling the respective oil equalizing bypass passages between their communication states and their interruption states so that lubricating oil flows alternately between the thermal source units in heating cycle operation and for holding the downstream sides of the oil equalization mechanisms in low pressure condition.

9. An oil equalizing operation control device for air conditioner according to claim 8, wherein a first thermal source unit and a second thermal source unit are provided, the oil equalization mechanism of the first thermal source unit has a first oil equalizing bypass pipe connected to the oil reserving part of the first thermal source unit and the pressure equalizing line, the oil equalization mechanism of the second thermal source unit has a second oil equalizing bypass pipe connected to the oil reserving part of the second thermal source unit and the pressure equalizing line, and the oil equalizing control means performs a first oil equalizing operation for providing communication in the first oil equalizing bypass pipe and the pressure equalizing line, interrupting the second oil equalizing bypass passage and adjusting the expansion mechanism of the second thermal source unit into a small opening to conduct lubricating oil from the first thermal source unit to the second thermal source unit and performs a second oil equalizing operation for providing communication in the second oil equalizing bypass pipe and the pressure equalizing line, interrupting the first oil equalizing bypass pipe and adjusting the expansion mechanism of the first thermal source unit into a small opening to conduct lubricating oil from the second thermal source unit to the first thermal source unit.

* * * * *